United States Patent
Uttamchandani et al.

(10) Patent No.: US 10,082,978 B2
(45) Date of Patent: Sep. 25, 2018

(54) DISTRIBUTED SHARED LOG STORAGE SYSTEM HAVING AN ADAPTER FOR HETEROGENOUS BIG DATA WORKLOADS

(71) Applicant: VMware, Inc., Palo Alto, CA (US)

(72) Inventors: Sandeep Uttamchandani, Cupertino, CA (US); Cheng Zhang, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 21 days.

(21) Appl. No.: 15/384,080

(22) Filed: Dec. 19, 2016

(65) Prior Publication Data

US 2018/0173451 A1 Jun. 21, 2018

(51) Int. Cl.
*G06F 3/06* (2006.01)
*G06F 12/02* (2006.01)
*G06F 12/0802* (2016.01)

(52) U.S. Cl.
CPC .......... *G06F 3/0644* (2013.01); *G06F 3/0604* (2013.01); *G06F 3/0631* (2013.01); *G06F 3/0673* (2013.01); *G06F 12/0292* (2013.01); *G06F 12/0802* (2013.01); *G06F 2212/60* (2013.01)

(58) Field of Classification Search
CPC .... G06F 3/0613; G06F 3/0631; G06F 3/0664; G06F 12/0292
See application file for complete search history.

(56) References Cited

U.S. PATENT DOCUMENTS

2012/0102187 A1* 4/2012 Bargoti ............... G06F 3/061
                                              709/224
2013/0204960 A1* 8/2013 Ashok ............... G06F 15/17
                                              709/213
2015/0169233 A1* 6/2015 Anderson ........... G06F 3/0613
                                              711/173

OTHER PUBLICATIONS

Kreps, et al., "Kafka: a Distributed Messaging Systems for Log Processing," NetD1311, Jun. 12, 2011, Athens, Greece, ACM 978-1-4503-0652-2/11/06, pp. 1-7.
Kreps, et al., "A Guide to the Kafka Protocol," https://cwiki.apache.org/confluence/display/KAFKA/A+Guide+To+The+Kafka+Protocol#AGuideToTheKafkaProtocol-ProduceAPI.
"APACHE KAFKA, A high-throughput distributed messaging system," http://kafka.apache.org/documentation.html#api.
Balakrishnan, et al., "CORFU: A Shared Log Design for Flash Clusters," 9th USENIX Symposium on Networked Systems Design and Implementation (NSDI '12), Apr. 1, 2012, pp. 1-14.
Balakrishnan, et al., "CORFU: A Distributed Shared Log," ACM Transactions on Computer Systems, vol. 31, No. 4, Article 10, Dec. 2013, pp. 1-24.

* cited by examiner

*Primary Examiner* — Hal W Schnee
(74) *Attorney, Agent, or Firm* — Patterson & Sheridan, LLP

(57) ABSTRACT

A distributed shared log storage system employs an adapter that translates APIs for a big data application to APIs of the distributed shared log storage system. The adapter is configured for different big data applications in accordance with a profile thereof, so that storage performance using the distributed shared log storage system can be comparable to the storage performance of the profiled big data application. An over-utilized adapter instance is detected and the workload assigned to the over-utilized adapter instance is either moved to a different adapter instance that can handle the workload or split among two or more adapter instances.

20 Claims, 18 Drawing Sheets

| topic1 | partition1 | broker1 | ~1804 |
| topic2 | partition1 | broker1 | ~1806 |
| topic2 | partition2 | broker1 | ~1808 |
| | | | |
| | | | | original registry ~1802

FIG. 18

| topic1 | partition1 | broker2 | ~1904 |
| topic2 | partition1 | broker2 | ~1906 |
| topic2 | partition2 | broker2 | ~1908 |
| | | | |
| | | | | modified registry ~1902

FIG. 19

| topic1 | partition1 | broker1 | ~2004 |
| topic2 | partition1 | broker2 | ~2006 |
| | | | |
| | | | |
| | | | ~2002 | registry 1

| topic1 | partition1 | broker1 | ~2010 |
| topic2 | partition2 | broker3 | ~2012 |
| | | | |
| | | | |
| | | | ~2008 | registry 2

FIG. 20

DISTRIBUTED SHARED LOG STORAGE SYSTEM HAVING AN ADAPTER FOR HETEROGENOUS BIG DATA WORKLOADS

BACKGROUND

The need for large and fast data stores in cloud computing has increased with widespread adoption of big data applications. These data stores need to be able to scale up to support hundreds of thousands of concurrent client operations per second, while still maintaining the data reliably. However, each of the big data applications in the cloud operates according to a different paradigm. For example, the Hadoop® paradigm is different from the SQL® paradigm, which is different from the Kafka™ paradigm. This has required that cloud computing providers dedicate different clusters to these different paradigms, resulting in inefficient use of the clusters and difficulty in managing a large variety of clusters.

BRIEF DESCRIPTION OF THE DRAWINGS

FIG. 18 depicts an original registry for an adapter instance.

FIG. 19 depicts an altered registry when moving a workload from one adapter instance to another adapter instance as illustrated in FIG. 16.

FIG. 20 depicts a divided registry when moving a workload from one adapter instance to multiple other adapter instances.

DETAILED DESCRIPTION

Embodiments provide a distributed shared log storage system to support data storage demands of big data workloads. In one embodiment, the distributed shared log storage system known as Corfu is used. In contrast to typical big data applications, such as Kafka, which applies namespace sharding on topics that are further divided into partitions, a distributed shared log storage system, such as Corfu, partitions the namespace across log unit servers in time rather than according to namespace and thus allows access to the entire namespace from any client. This enables extreme scaling and richer ordering guarantees, although it is at the expense of performance overheads due to serialization and distributed state.

Figure 1:
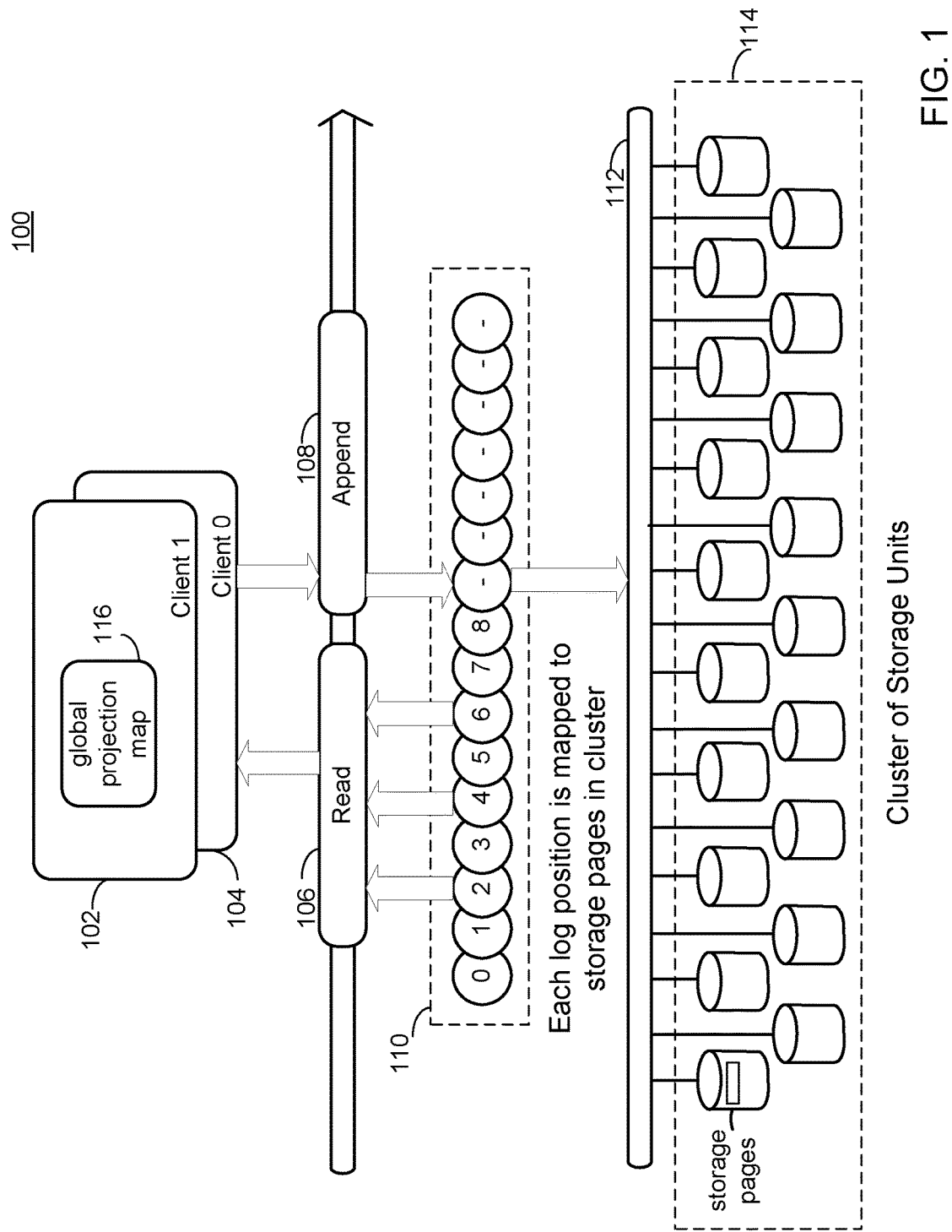
FIG. 1 is a block diagram of a distributed shared log storage system in which embodiments may be practiced.

FIG. 1 is a block diagram of a distributed shared log storage system in which embodiments may be practiced. The system depicted includes one or more clients 102, 104, each having a global projection map 116, a shared log 110, and a cluster of storage units 114, each of which has a plurality of storage pages. Each position in the shared log is projected onto the storage pages in the cluster of storage units by means of global projection map 116. A client 102, 104 can read anywhere in shared log 110 but may only append to shared log 110, i.e., write to the end of shared log 110. Thus, shared log 110 is a read-many write-once distributed log.

The distributed shared log storage system supports multiple clients 102, 104, which means that more than one client can concurrently attempt to append to shared log 110. The system employs a central sequencer (206, FIG. 2) to prevent multiple clients 102, 104 from writing to the same log position, thereby guaranteeing that each log position is only written once.

Global projection map 116 can be changed at any time and integers called epoch numbers sequentially mark each version of the map. When the map is retired, e.g., by a seal operation, a new map is created and a new epoch number is assigned.

Figure 2:
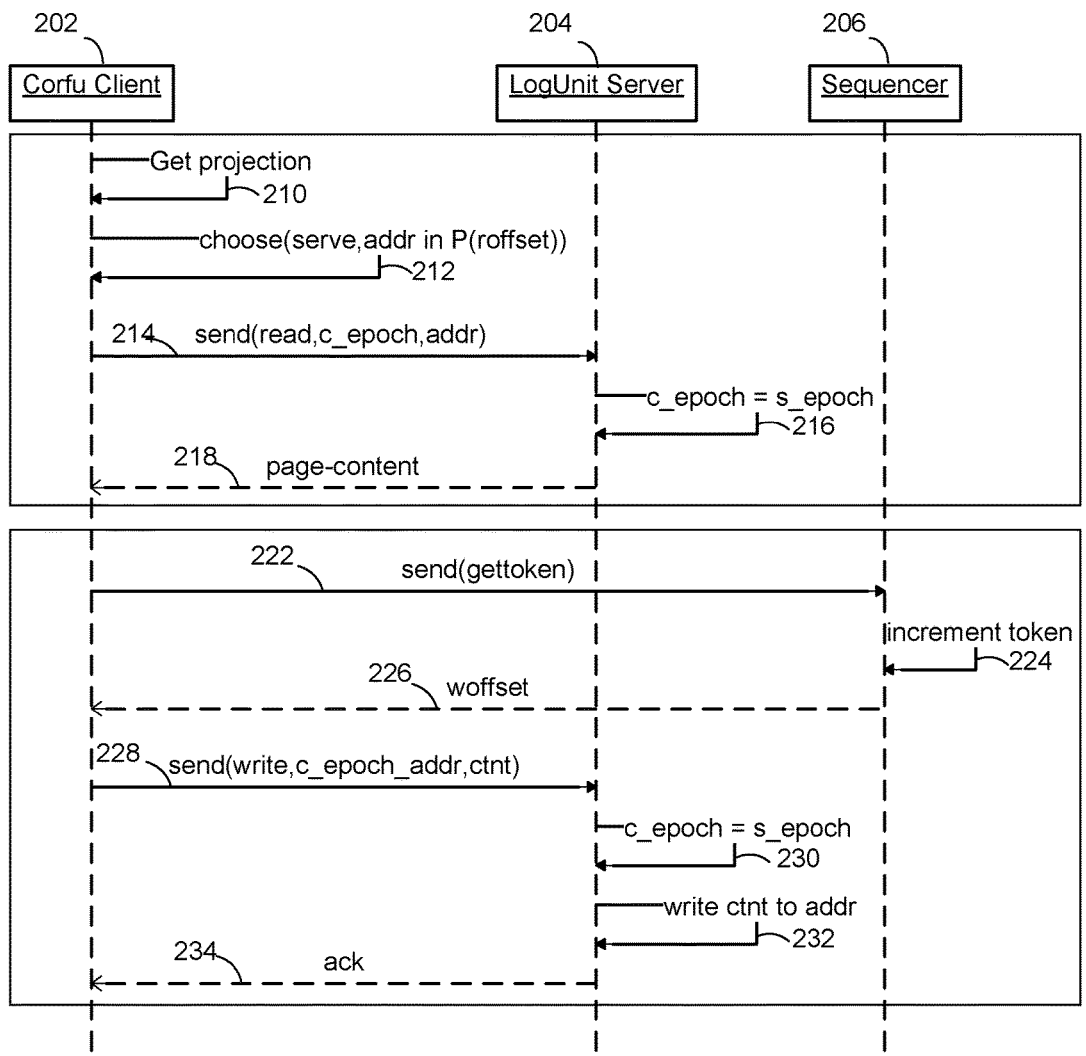
FIG. 2 is a sequence diagram of read and write operations carried out in the distributed shared log storage system.

FIG. 2 is a sequence diagram of a read operation 208 and a write operation 220 carried out in the distributed shared log storage system. For a read, the client (depicted in FIG. 2 as client 202) in step 210 gets the current projection map, and then chooses, in step 212, a server and an address using the current projection map from which the data is to be read. The client then sends a read command in step 214 to a particular log unit server (which is the storage unit depicted in FIG. 2 as log unit server 204) with the current epoch number. The log unit server checks the epoch number in step 216, performs the read, and returns the data in step 218. Sequencer 206 is not involved in read operation 208 because reads of the shared log are permitted at any position in the log.

For a write, the client write first obtains in steps 222 and 226 a token and write offset from the sequencer 206. Then, using the current projection map, the client sends in step 228 a write command to the log unit server with the current epoch, address and content to be appended to the log at the write offset. The log unit server checks to see if the current epoch matches the server epoch in step 230, and if so, performs the write in step 232 and sends an acknowledgment to the client in step 234 to indicate that the log unit server succeeded in writing the content to the specified address.

Figure 3:
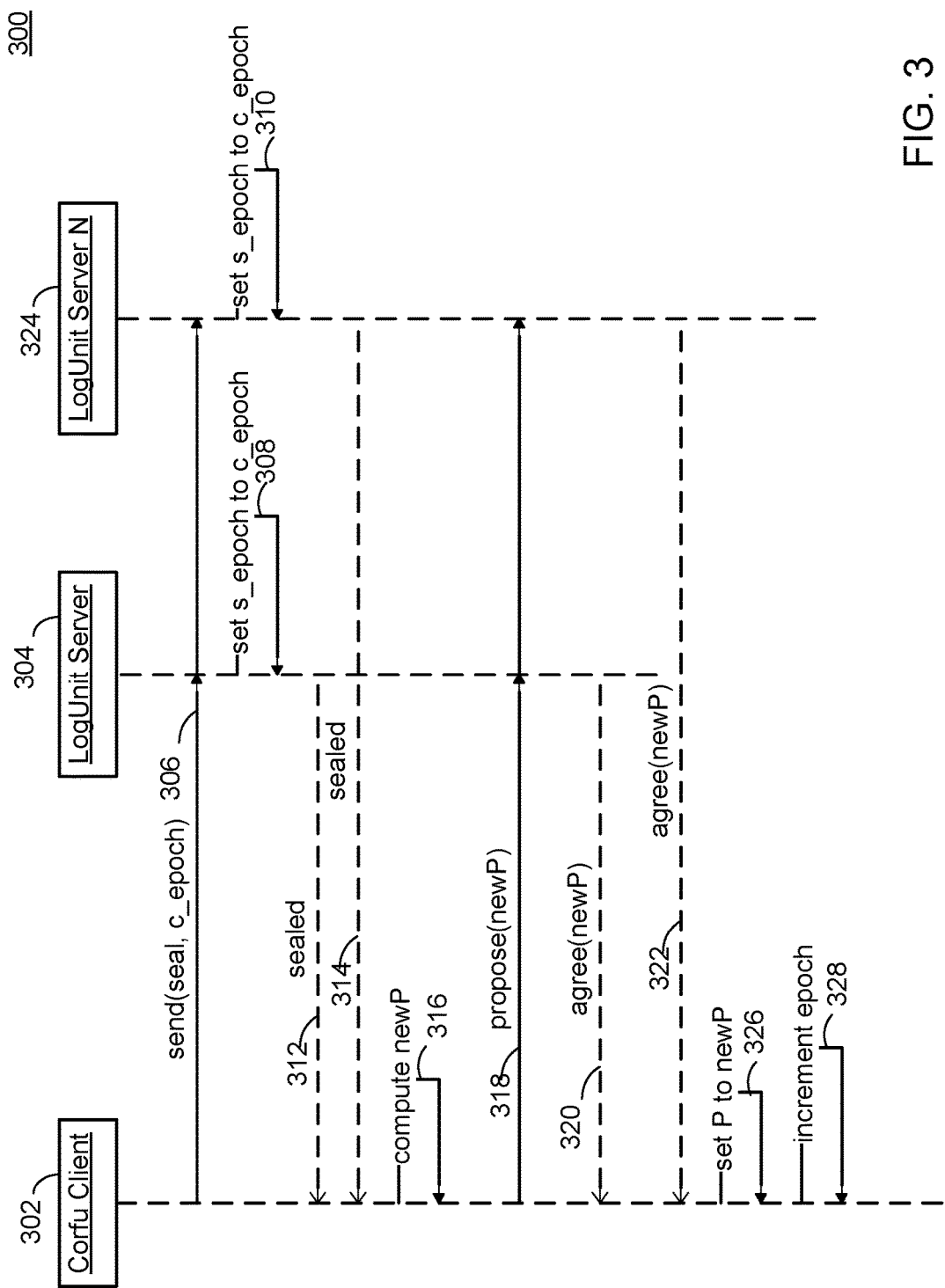
FIG. 3 is a sequence diagram of a reconfiguration operation carried out in the distributed shared log storage system.

FIG. 3 is a sequence diagram of a reconfiguration operation carried out in the distributed shared log storage system. Reconfiguration operation 300 is carried out when and if there is a failure in a log unit server so that contents of global projection map 116 can be modified accordingly. The ability to change the projection map during a reconfiguration allows new storage units (described herein as log unit servers) to be added and mapped, as needed.

In FIG. 3, the client (depicted in FIG. 3 as client 302) first sends a seal command with the current epoch in step 306 to all of the log unit servers (depicted in FIG. 3 as log unit servers 304-324). Each log unit server then checks to see if the current epoch matches the server epoch in steps 308, 310, and if so, acknowledges in steps 312, 314 that the projection map is sealed, meaning that it can no longer be used. The client then computes a new projection map in step 316 and proposes the new projection map in step 318 to the log unit servers. When all or a majority of the log unit servers agree with the proposed new projection map (steps 320, 322), the client sets the new projection map in step 326 and the epoch number is incremented in step 328 so that the old projection map cannot be used.

Figure 4:
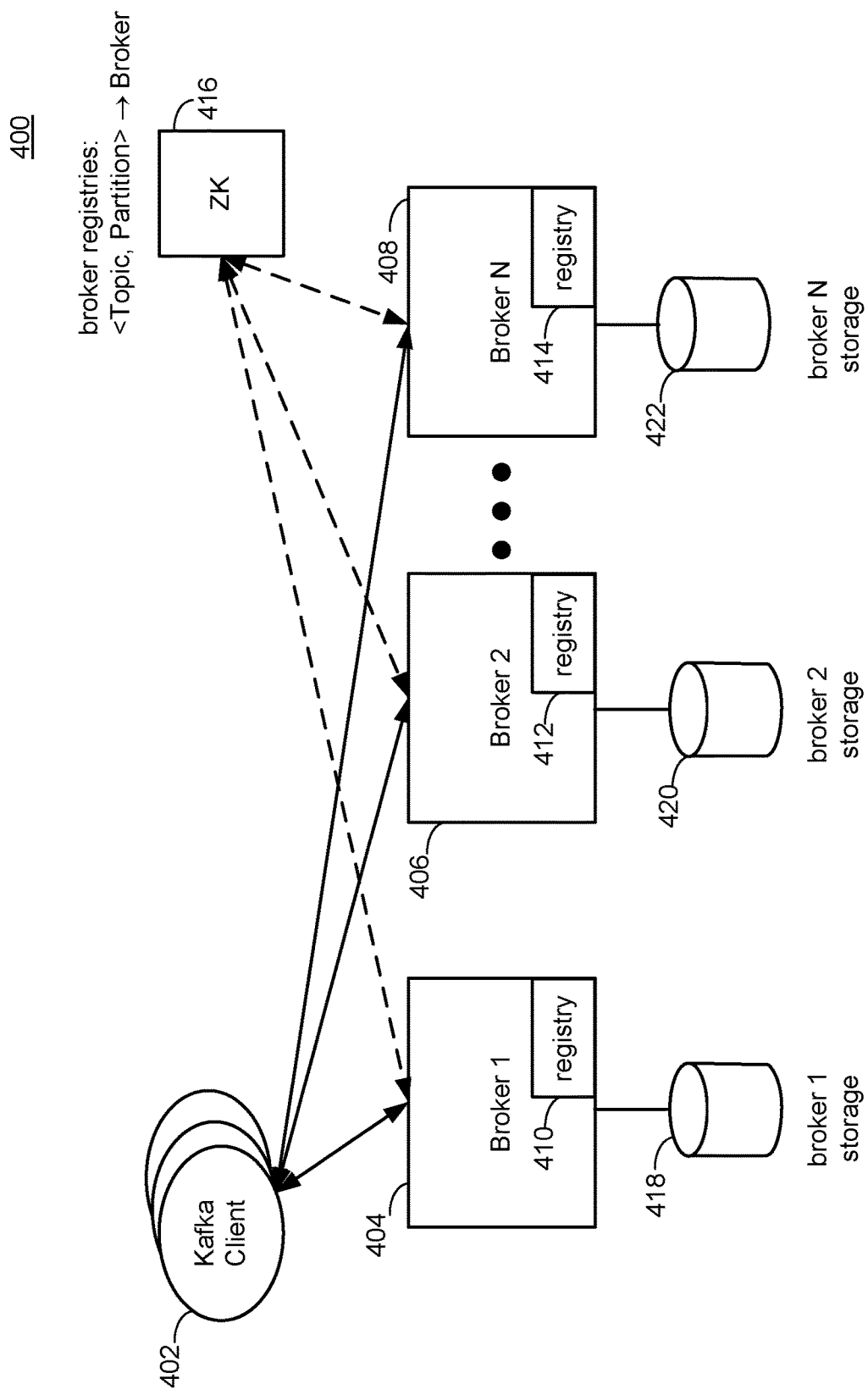
FIG. 4 is a conceptual diagram depicting an operation of an example big data application that generates one of the heterogeneous big data workloads.

FIG. 4 is a conceptual diagram depicting an operation of an example big data application that generates one of the heterogeneous big data workloads. The example big data application is Kafka, which implements a concurrent producer/consumer messaging application. As depicted, each Kafka client 402, which is either a producer or a consumer of messages, is able to communicate with a plurality of brokers 404, 406, 408, which store the messages in storage devices 418, 420, 422 attached to the brokers. Typically, one of the brokers 404, 406, 408 is declared a leader for a partition and the others, followers. The followers store replica partition data to provide high availability and failure-tolerance.

A message or message stream is associated with a topic, which is divided into multiple partitions. The partitions are distributed over the plurality of brokers 404, 406, 408 to support high degrees of concurrency and throughput.

A message is "produced" by appending it to the end of a particular partition for the topic. A message can only be consumed after it is produced and stored in one of the brokers and messages in a particular partition must be consumed in the order in which the partition stores them. The point in a partition at which a consumer consumes message is called the offset. A zookeeper service (ZK) 416 includes a registry that keeps track of the mapping between a <topic, partition> pair and a broker, which handles the <topic, partition> pair.

Figure 5:
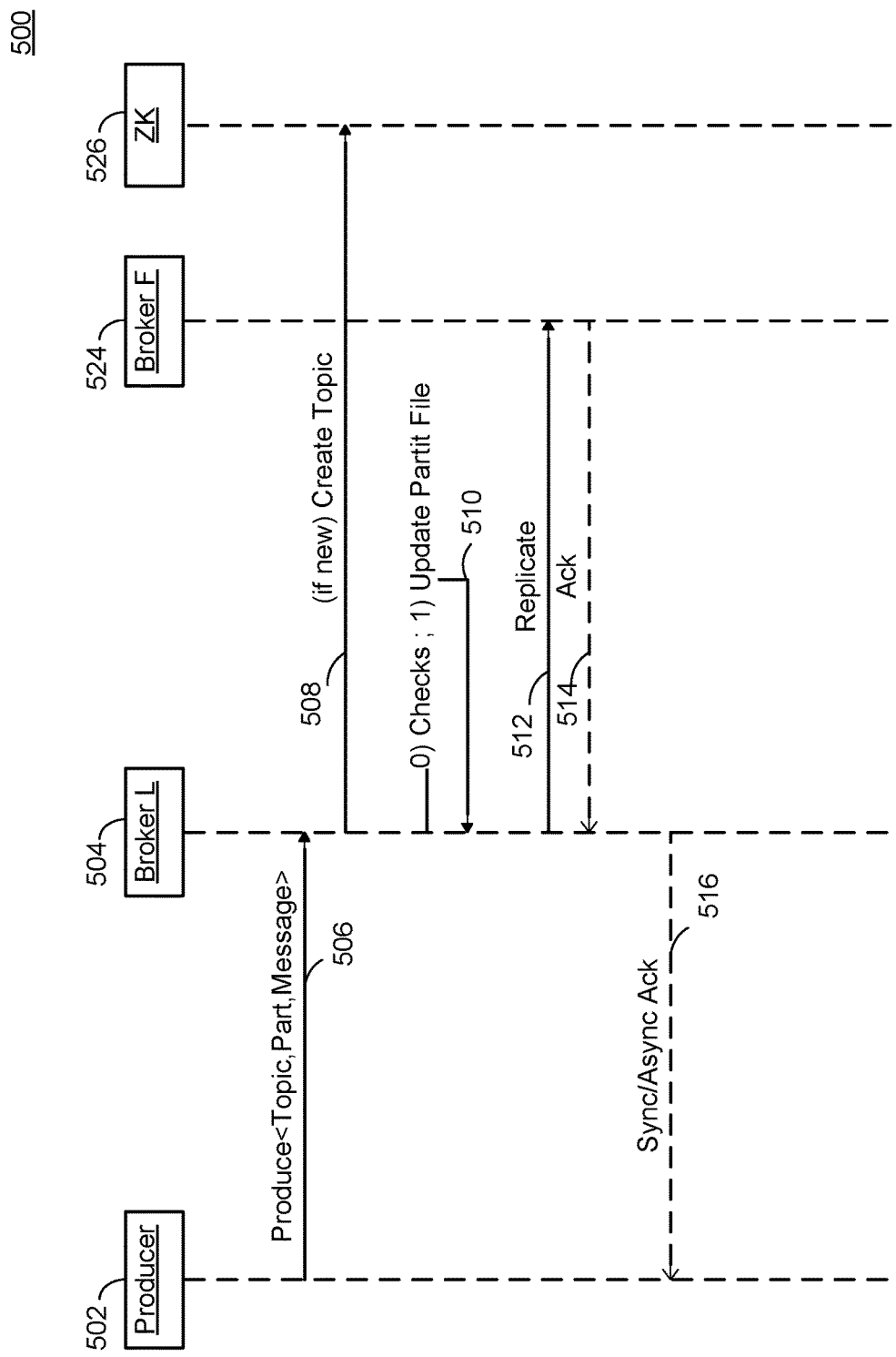
FIG. 5 is a sequence diagram of a produce operation carried out in the big data application depicted in FIG. 4.

FIG. 5 is a sequence diagram of a produce operation 500 carried out in the Kafka system depicted in FIG. 4. As depicted, a producer 502 sends in step 506 a message to a broker 504 (Broker L, the leader for the topic) naming the <topic, partition> pair to which the message belongs. If the topic is new, it is created in step 508 and registered with the zookeeper 526. Next, the broker 504 performs certain checks, updates the partition file with new message in step 510 and requests that a broker follower (BF) 524 store in step 512 a replica. Upon receiving an acknowledgment from the broker follower in step 514, the broker leader 504 sends an acknowledgment in step 516 to the producer 502. The acknowledgment can include the topic name, partition and offset in the partition at which the message is stored.

It should be noted that more complex producer operations are possible. A producer can, in one command, send a set of messages to each partition in a list of partitions for each topic in a list of topics.

Figure 6:
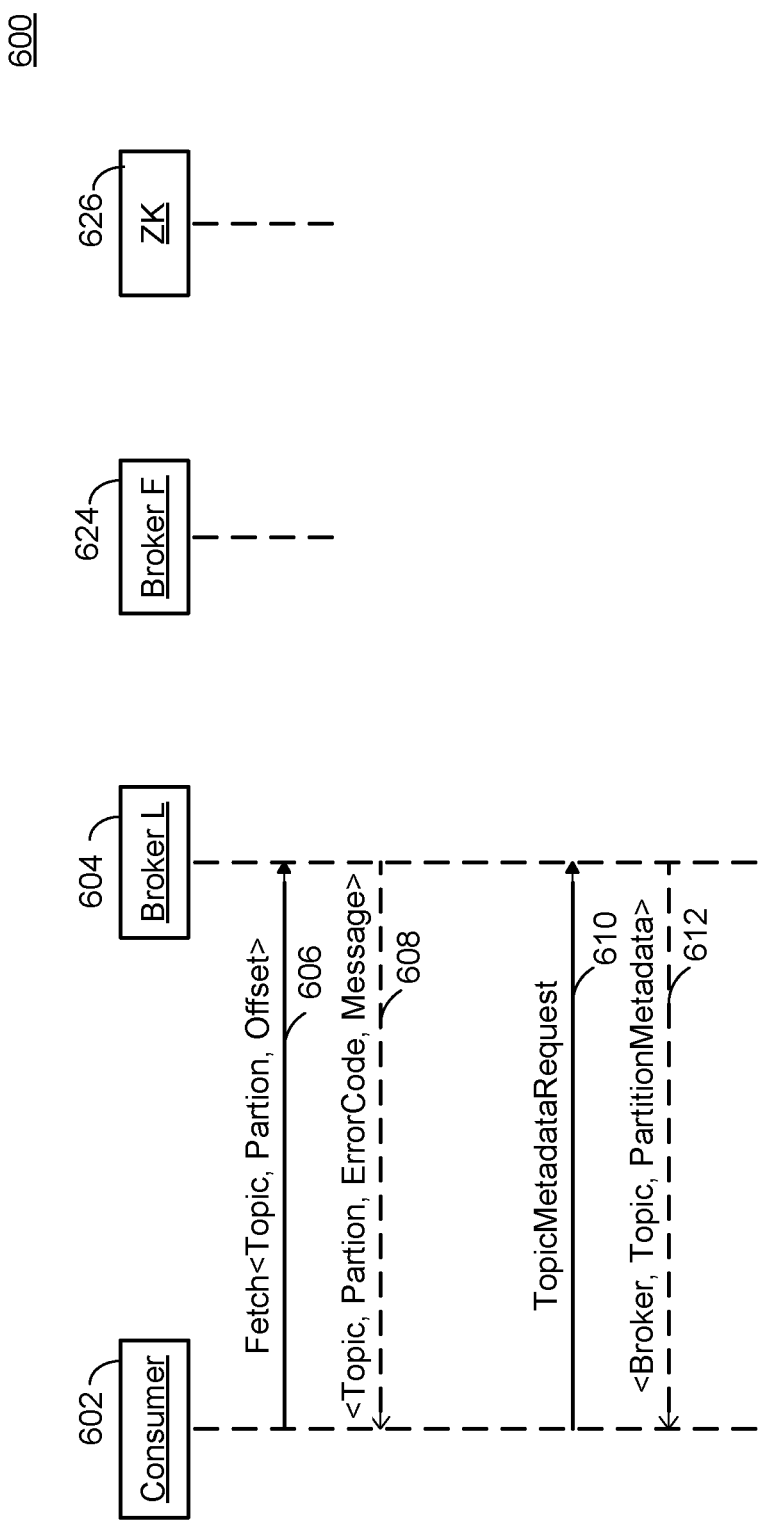
FIG. 6 is a sequence diagram of a consume operation carried out in the big data application depicted in FIG. 4.

FIG. 6 is a sequence diagram of a fetch operation 600 carried out in the Kafka system depicted in FIG. 4. As depicted, a consumer 602 sends in step 606 a message to a broker 604 (Broker L) to fetch a message located at a particular offset within a partition of a particular topic. In response, the broker 604 returns the requested message <Topic, Partition, ErrorCode, Message> in step 608, where the ErrorCode field can convey any error, such as 'broker not owner', encountered by the fetch. The consumer 602 can also make a metadata request in step 610 regarding a particular topic. In response, the broker 604 or brokers 604-624 return in step 612 to the consumer <Broker, Topic, PartitionMetadata> which includes an ID of the partition, the broker leader in charge of the partition, and any replica brokers (broker followers) for the partition.

It should be noted that more complex fetch operations are possible. A consumer can, in one command, fetch a specified maximum number of bytes from each partition in a list of partitions for each topic in a list of topics.

Figure 7:
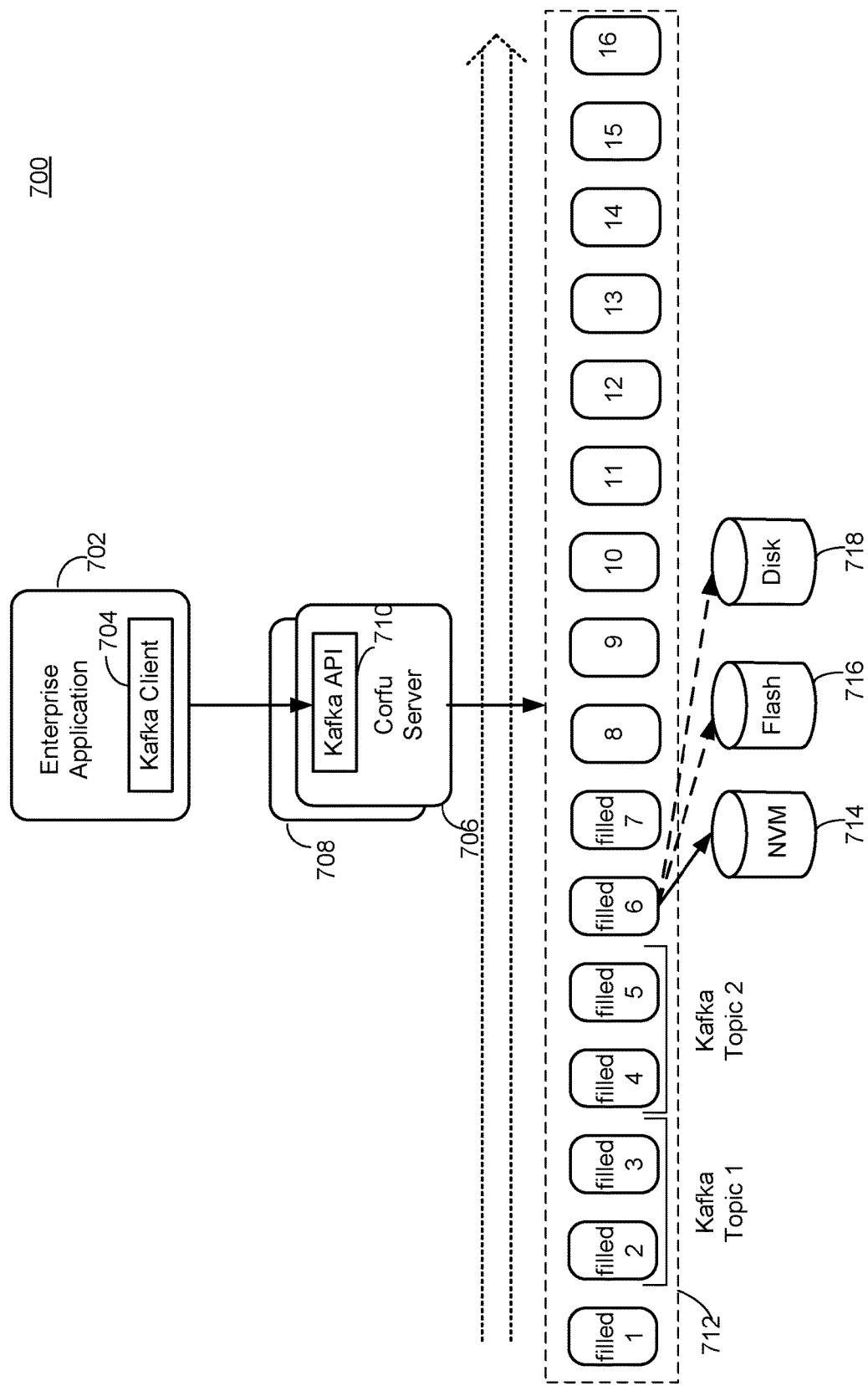
FIG. 7 is a block diagram of the distributed shared log storage system that supports the big data application depicted in FIG. 4.

FIG. 7 is a block diagram of the distributed shared log storage system that supports the Kafka system depicted in FIG. 4. As illustrated, an enterprise application 702 includes a Kafka client 704, which interacts with a Kafka Applications Programming Interface (API) 710 that is supported by the distributed shared log storage system according to embodiments (e.g., Corfu servers 706, 708). The Corfu servers 706, 708 provide the persistent storage that is needed for the Kafka application. As depicted in FIG. 7, the Corfu append log 712 in storage is only partially filled. Items 2 and 3 in the log contain Kafka Topic 1 and items 4 and 5 contain Kafka Topic 2. It should be recognized that storage pages in the append log 712 can be backed by non-volatile memory 714, flash memory 716, and/or disk 718.

Figure 8:
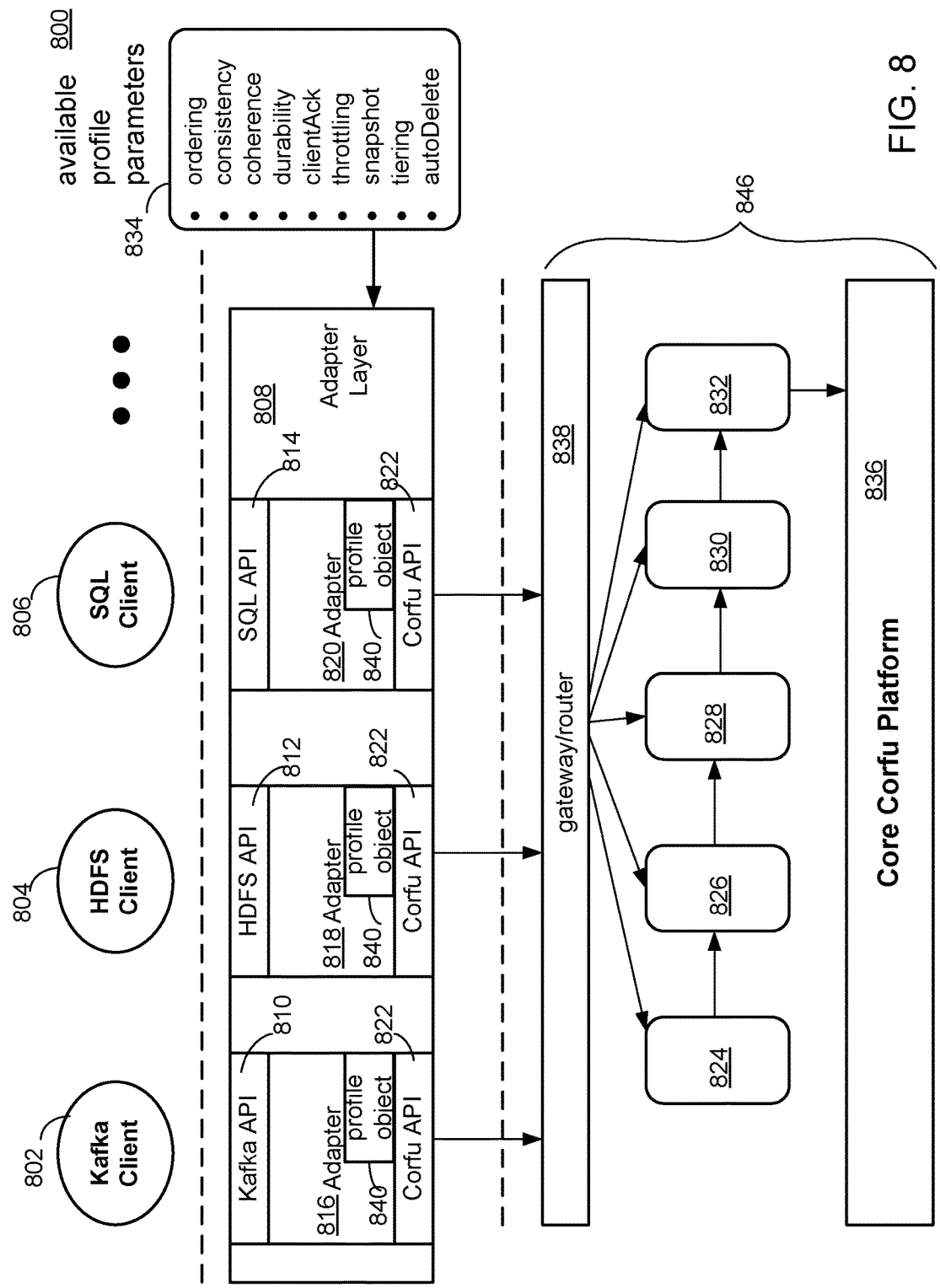
FIG. 8 is a block diagram of the distributed shared log storage system supporting heterogeneous big data applications.

In order for Corfu servers 706, 708 to provide the persistent storage that is needed for the Kafka application, an adapter layer 816 shown in FIG. 8 translates the Kafka APIs into Corfu APIs.

FIG. 8 depicts a block diagram of the distributed shared log storage system supporting heterogeneous big data applications, including Kafka.

As depicted in FIG. 8, the system includes various clients 802, 804, 806 and adapters 816, 818, 820, and a modified Corfu platform 846.

Each client 802, 804, 806 is present for a different type of application, such as Kafka, the file system of Hadoop, and SQL. The clients 802, 804, 806 make requests for operations relating to the type of application of the client. For example, the Kafka client 802 makes Fetch and Produce requests such as those depicted in FIGS. 5 and 6.

The core Corfu platform 836 is a Corfu system such as that shown in FIG. 1. The modified Corfu platform 846 is a core Corfu platform 836 with an added gateway/router layer 838 and a set of processing modules 824, 826, 828, 830, 832. The processing modules 824, 826, 828, 830, 832 structure the processing of operations requested by a client 802, 804, 806 of an application.

The adapters 816, 818, 820 residing in an adapter layer 808, provide an interface between the clients 802, 804, 806 for the different applications and the modified Corfu system 846 and operate in accordance with respective profile objects 840 in each adapter 816, 818, 820 that determines a set of processing modules 824, 826, 828, 830, 832 in the modified Corfu system 846 needed to perform an application operation requested by a client 802, 804, 806.

The profile object 840 contains a set of <operation, profile> pairs, where a profile entry in the pair is a <parameter, value> pair in accordance with the following available profile parameter list 834.

| Parameter | Possible value | Possible value | Possible value |
|---|---|---|---|
| ordering | global | local | None |
| consistency | strong | weak | stale |
| coherence | atomic | stale | — |
| durability | strong | normal | fragile |
| clientAck | push | pull | — |
| throttling | True | False | — |
| snapshot | True | False | — |
| tiering | True | False | — |
| autoDelete | True | False | — |

For example, if the application is Kafka, the requested operation made by the Kafka client 802 is to fetch a specified <topic, partition> pair and the Kafka client 802 additionally requests that the operation be globally ordered, then the request is formulated as fetch[<topic, partition>, <ordering, global>]. The adapter 816 for Kafka client 802 sends this information via the Corfu API 822 to the gateway/router 838 so that the gateway/router 838 can determine the processing modules 824, 826, 828, 830, 832 needed to fulfill the request. Fulfilling a globally ordered request requires that the processing modules 824, 826, 828, 830, 832 invoke a single global sequencer in the Corfu platform 836 to enforce the ordering request Alternatively, if the Kafka client 802 requests that the consume operation be locally ordered, formulating the request as fetch[<topic, partition>, <ordering, local>], then the processing modules 824, 826, 828, 830, 832 invoke use a sharded sequencer to provide local ordering to the <topic, partition> pair. Ordering with respect to other <topic, partition> pairs is not guaranteed, because they are subject to only one of the sharded sequencers, the other sharded sequencers operating independently.

The ability to apply profile parameters in the processing of each request of an application permits the available profiles to alter the native character of the application, thus transforming the application into an entirely new application.

For example, a Kafka system is weak with regard to data durability. At the request of the Kafka client, the Kafka system can be altered to have a two-phase commit protocol, thus transforming Kafka into a completely new application, Kafka with ACID (Atomicity, Consistency, Isolation and Durability) properties. The Kafka client 802 requests fetch [<topic, partition>, <coherence, atomic>], and the two-phase commit protocol is enforced on the fetch operation.

This is true for other big data applications, such as Spark, HDFS and SQL, for which adapters are provided to convert the APIs of these big data application into Corfu APIs according to a client-selected profile parameter.

Figure 9:
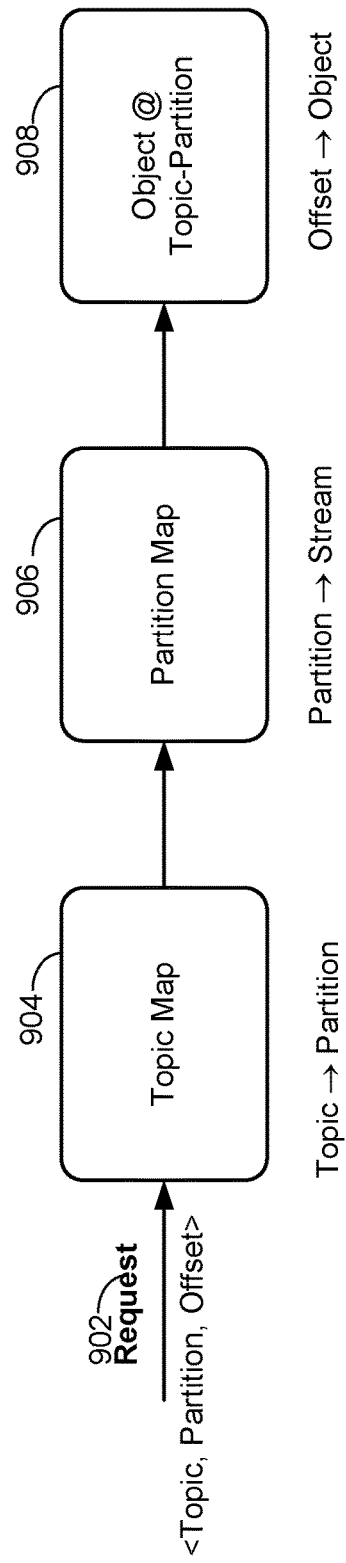
FIG. 9 depicts mappings employed by the distributed shared log storage system to support big data applications.

FIG. 9 depicts mappings employed in the adapter layer of the distributed shared log storage system to support big data applications, in particular the Kafka system. Maps 900 include a topic map 904, a partition map 906 and an object table 908 at the topic-partition location. Maps take in a request 902 in the form of a tuple <topic, partition, offset> and return an object for the <topic, partition, offset> that is requested. Specifically, topic map 904 translates a topic name to a partition. Partition map 906 translates the partition to a stream and object table 908 translates the offset to a position in the stream of the object. In one embodiment, topic map 904 has a key-value pair where the keys are the topics and the value maps to a partition, which is also a key-value pair. Partition map 906 then uses its keys for the partitions and the values to map to the Stream/SMRObject. The object table of SMRObjects is also a key-value pair store, where the keys are the offsets and the values are the data. SMRObjects, which are available as an API provided by Corfu, are used for their atomic read/write guarantees.

Figure 10:
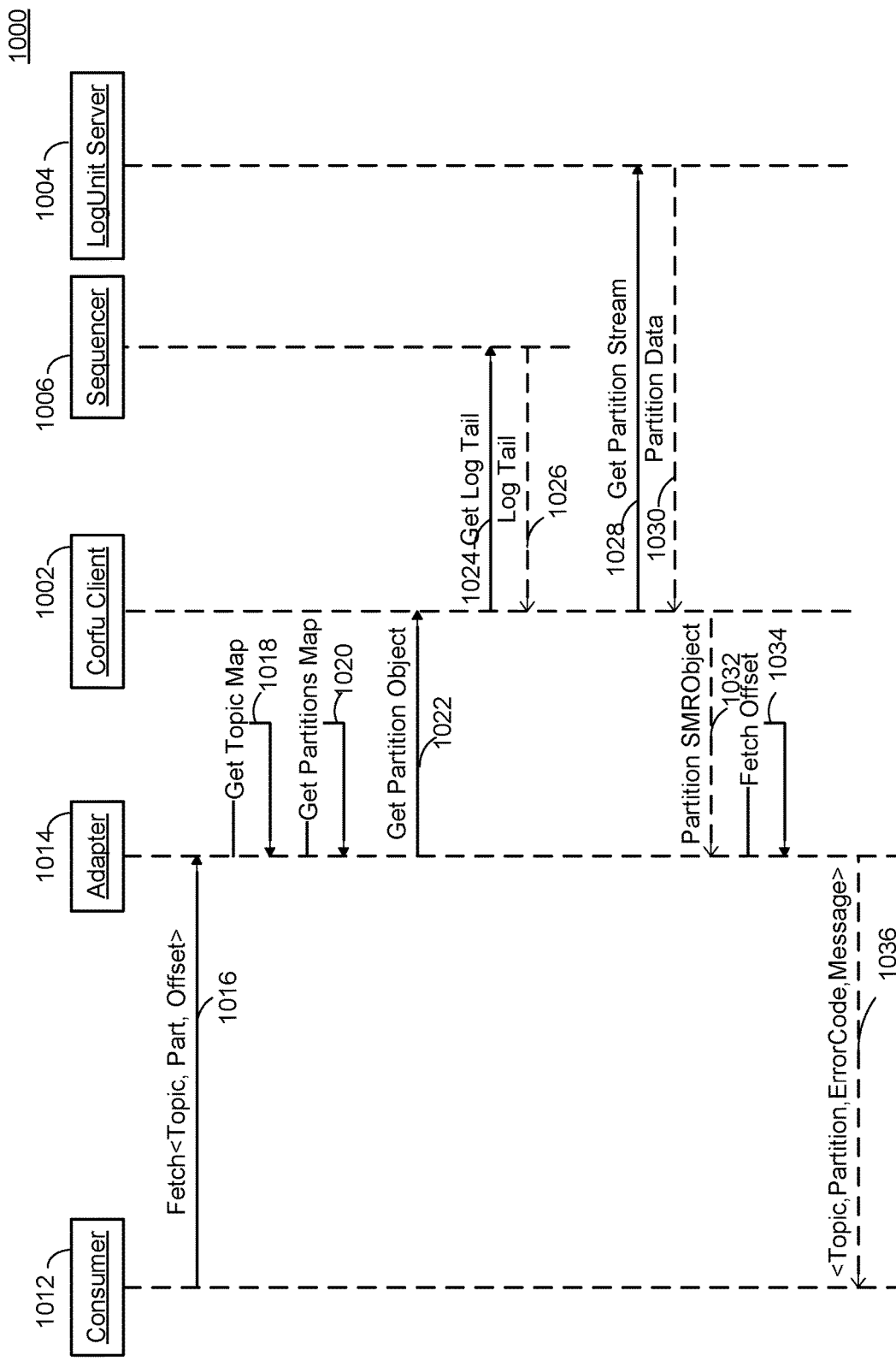
FIG. 10 is a sequence diagram of a first embodiment of an operation carried out in the distributed shared log storage system to support the consume operation depicted in FIG. 6.

FIG. 10 is a sequence diagram of a first embodiment of an operation carried out in the distributed shared log storage system to support the consume operation depicted in FIG. 6. In FIG. 10, a consumer 1012 sends a fetch<Topic, Partition, Offset> request to adapter 1014 in step 1016. In response, adapter 1014 accesses the topic map in step 1018 and the partition map in step 1020, and then requests the partition object in step 1022 from Corfu client 1002. Corfu client 1002 requests and gets the log tail from sequencer 1006 in steps 1024 and 1026 to make sure it has the latest data, and requests the partition stream in step 1028 from log unit server 1004. The partition data is then returned in step 1030 from log unit server 1004 to Corfu client 1002, which then passes the partition object to adapter 1014 in step 1032. Adapter 1014 then uses the provided offset to obtain the requested data in step 1034, which it then returns to consumer 1012 in step 1036. In this embodiment, an extra I/O is incurred to obtain the partition object and a data fetch I/O is incurred, as data is returned to the consumer only after obtaining it from the Corfu system.

Figure 11:
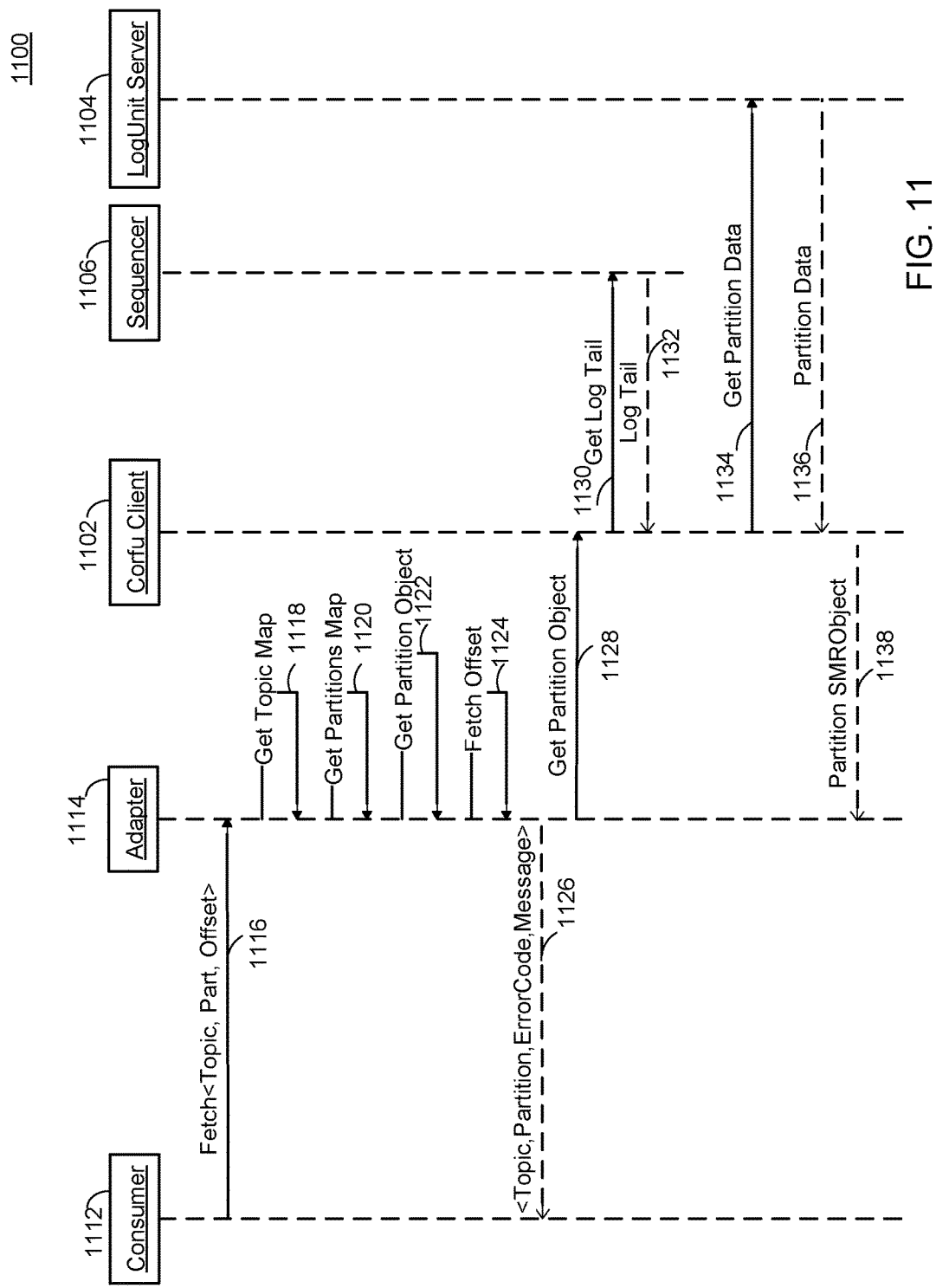
FIG. 11 is a sequence diagram of a second embodiment of an operation carried out in the distributed shared log storage system to support the consume operation depicted in FIG. 6.

FIG. 11 is a sequence diagram of a second embodiment of an operation carried out in the distributed shared log storage system to support the fetch operation depicted in FIG. 6. In FIG. 11, a consumer 1112 sends a fetch request in step 1116 to adapter 1114, which responds by accessing the topic map in step 1118 and the partitions map in step 1120. Adapter 1114 then obtains the partition object in step 1122 and fetches the data at the specified offset in step 1124. Adapter 1114 then returns the data to consumer 1112 in step 1126.

As a background process, adapter 1114 performs a log tail and data refresh. These refreshes reduce the amount of work performed when the client requests data. Refresh is implemented as a continuous polling of the metadata to track append operations to the Corfu log. To perform these refreshes, adapter 1114 requests the partition object from Corfu client 1102 in step 1128. In response, Corfu client 1102 requests in step 1130 and receives in step 1132 the log tail from sequencer 1106, and requests in step 1134 and receives in step 1136 the partition data from the log unit server 1104. Corfu client 1102 then passes the requested partition object to adapter 1114 in step 1138. Thus, adapter 114 in this embodiment keeps an in-memory representation of the metadata. This in-memory representation is continuously refreshed in the background. Given the sequential behavior of topic accesses, it is beneficial to hold in memory the data using pre-fetching techniques for subsequent accesses.

Figure 12:
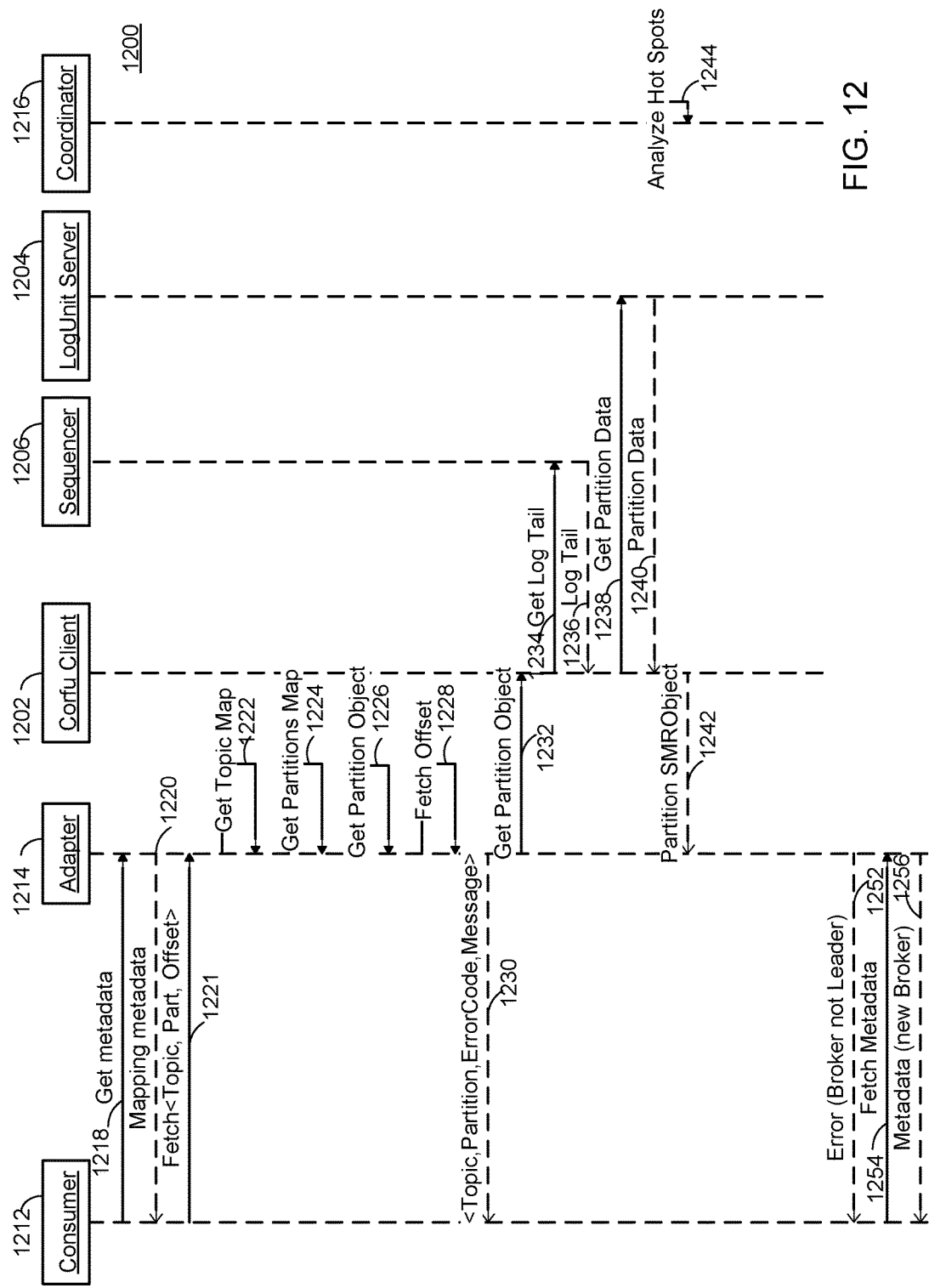
FIG. 12 is a sequence diagram of a third embodiment of an operation carried out in the distributed shared log storage system to support the consume operation depicted in FIG. 6.

FIG. 12 is a sequence diagram of a third embodiment of an operation carried out in the distributed shared log storage system to support the consume operation depicted in FIG. 6. In FIG. 12, a consumer 1212 requests from adapter 1214 in step 1218 and obtains metadata in step 1220. The metadata includes registry, i.e., a list of brokers and the <topic, partition> metadata they own. Adapter 1214 then receives a Fetch<Topic, Partition, Offset> that includes the topic, partition and offset in step 1221, accesses the topic map in step 1222 and the partitions map in step 1224, and then accesses the partition object in step 1226. Adapter 1214 then obtains the data at the specified offset in step 1228 and returns it to consumer 1212 in step 1230. In this embodiment, the initial allocation of <topic, partitions> to specific brokers is based on the hardware configuration and in the embodiment, each Kafka client gets the same registry, i.e., for a given <topic, partition>, it returns the address of the same broker.

As a background process, adapter 1214 refreshes the partition object and log tail by first requesting the partition object from Corfu client 1202 in step 1232, which then requests in step 1234 and obtains in step 1236 the log tail from sequencer 1206 and the partition data from the log unit server 1204 in steps 1238 and 1240. Corfu client 1202 then refreshes adapter 1214 in step 1242 with the requested partition object.

Additionally, in the background, a coordinator 1216, which is an additional node within the Corfu cluster, analyzes hotspots in the Corfu platform in step 1244. Handling hot spots, i.e., over-utilized adapters, is discussed further in regard to FIGS. 15-20.

Finally, adapter 1214 notifies consumer 1212 in step 1252 of any errors or failures, such as when a particular broker is not a leader for a given <topic, partition>. Consumer 1212 can then request in step 1254 and receive in step 1256 metadata from adapter 1214 to discover a new broker.

Thus, in this embodiment, a different registry is given to different sets of clients. This allows for load balancing across the nodes. This embodiment is an adaptive model in which the topic-partition starts as a single broker and the system dynamically breaks it down into multiple projections based on load patterns.

Figure 13:
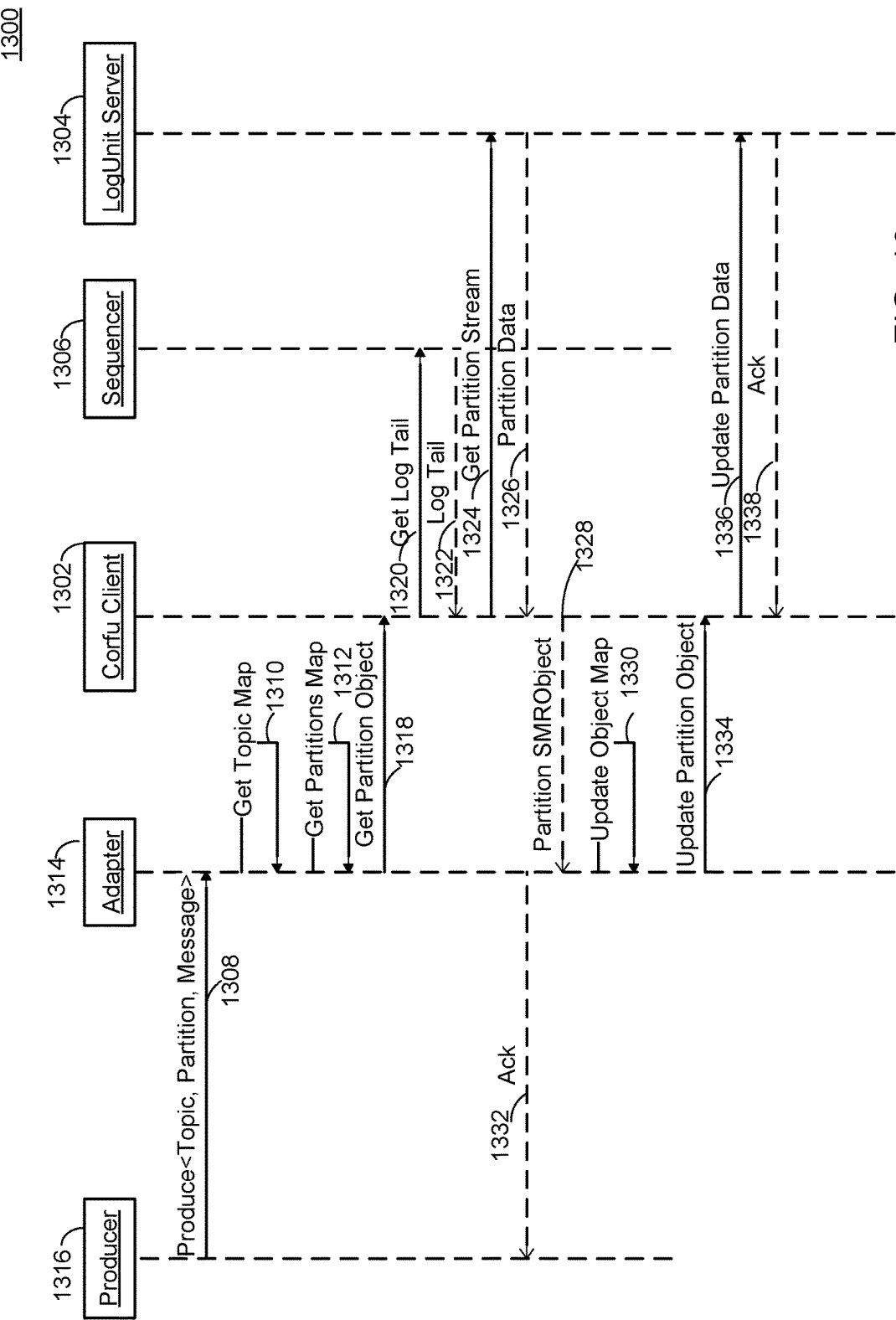
FIG. 13 is a sequence diagram of an operation carried out in the distributed shared log storage system to support the produce operation depicted in FIG. 6.

FIG. 13 is a sequence diagram of an operation carried out in the distributed shared log storage system to support the produce operation depicted in FIG. 6. In the figure, a Kafka Producer 1316 sends a Produce<Topic, Partition, Message> tuple to adapter 1314. Adapter 1314 then obtains the topic map in step 1310 and the partition map in step 1312, and then requests in step 1318 and gets in step 1328 the partition object. Corfu client 1302 obtains the log tail in steps 1320 and 1322 and the partition data in steps 1324 and 1326. When the partition object is delivered in step 1328, adapter 1314 updates in step 1330 the partition object with the new message and provides in step 1332 an acknowledgement back to Producer 1316. Adapter 1314 also updates the partition object in the Corfu system in step 1334 by requesting in step 1336 that the new data be appended to the storage page in log unit server 1304 for which it receives and acknowledgment in step 1338.

Referring back to FIG. 4, which depicts a standard Kafka setting with a plurality of Kafka clients 402 and a plurality of Kafka brokers 404, 406, 408, it is noted that each Kafka broker 404, 406, 408 has its own local storage 418, 420, 422, respectively, and shares nothing with other brokers. This arrangement creates a problem. If the broker registries 410, 412, 414 are such that a particular broker handles a large volume of Kafka fetch traffic, then that broker becomes a hot spot, which slows the system down. Standard Kafka systems have no solution for this problem because storage of data is local to the over-utilized broker. Embodiments depicted in FIG. 15-20 address broker over-utilization in Kafka.

Figure 14:
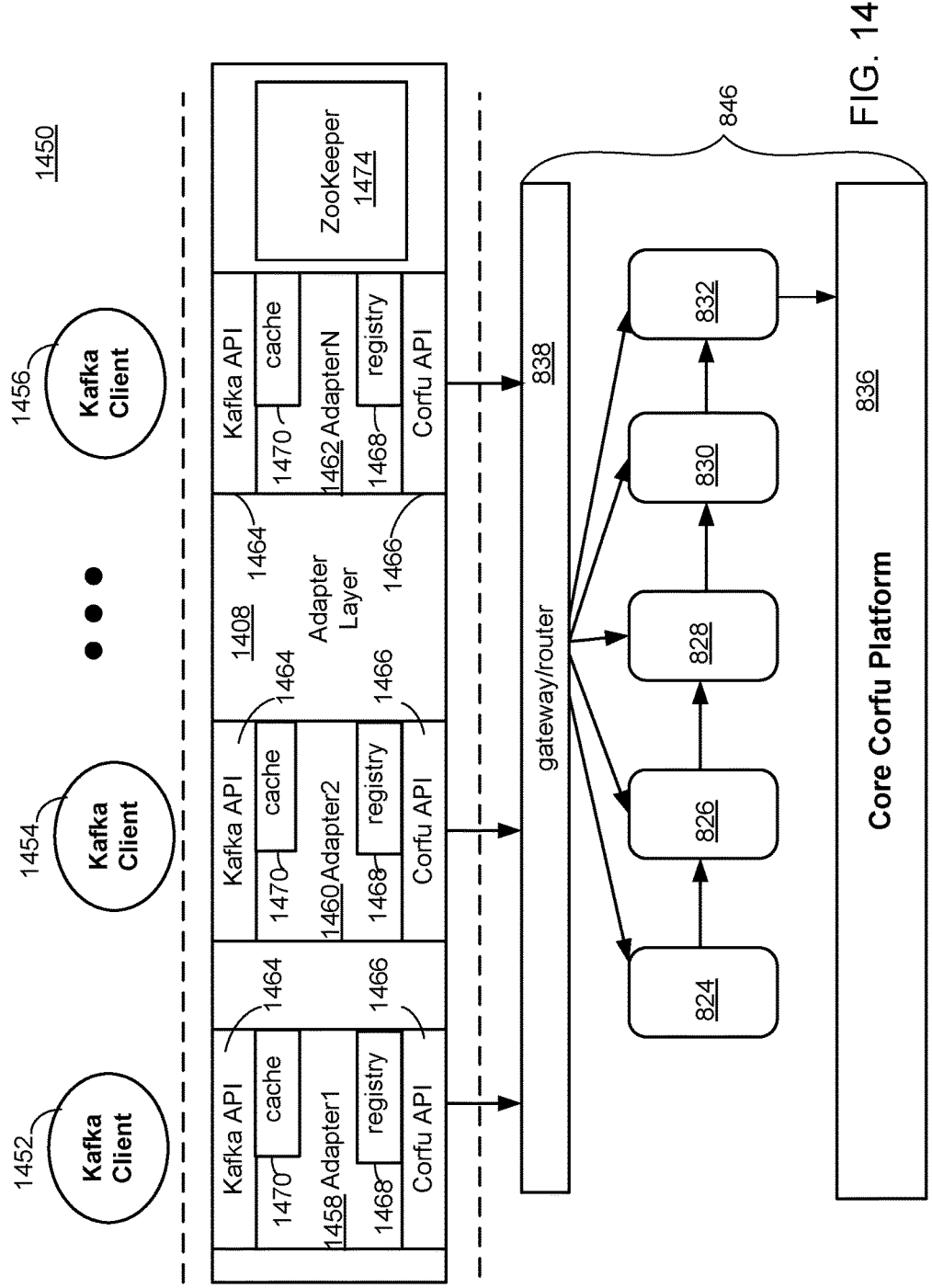
FIG. 14 is a block diagram of a distributed system having multiple adapter instances in which embodiments may be practiced.
Figure 15:
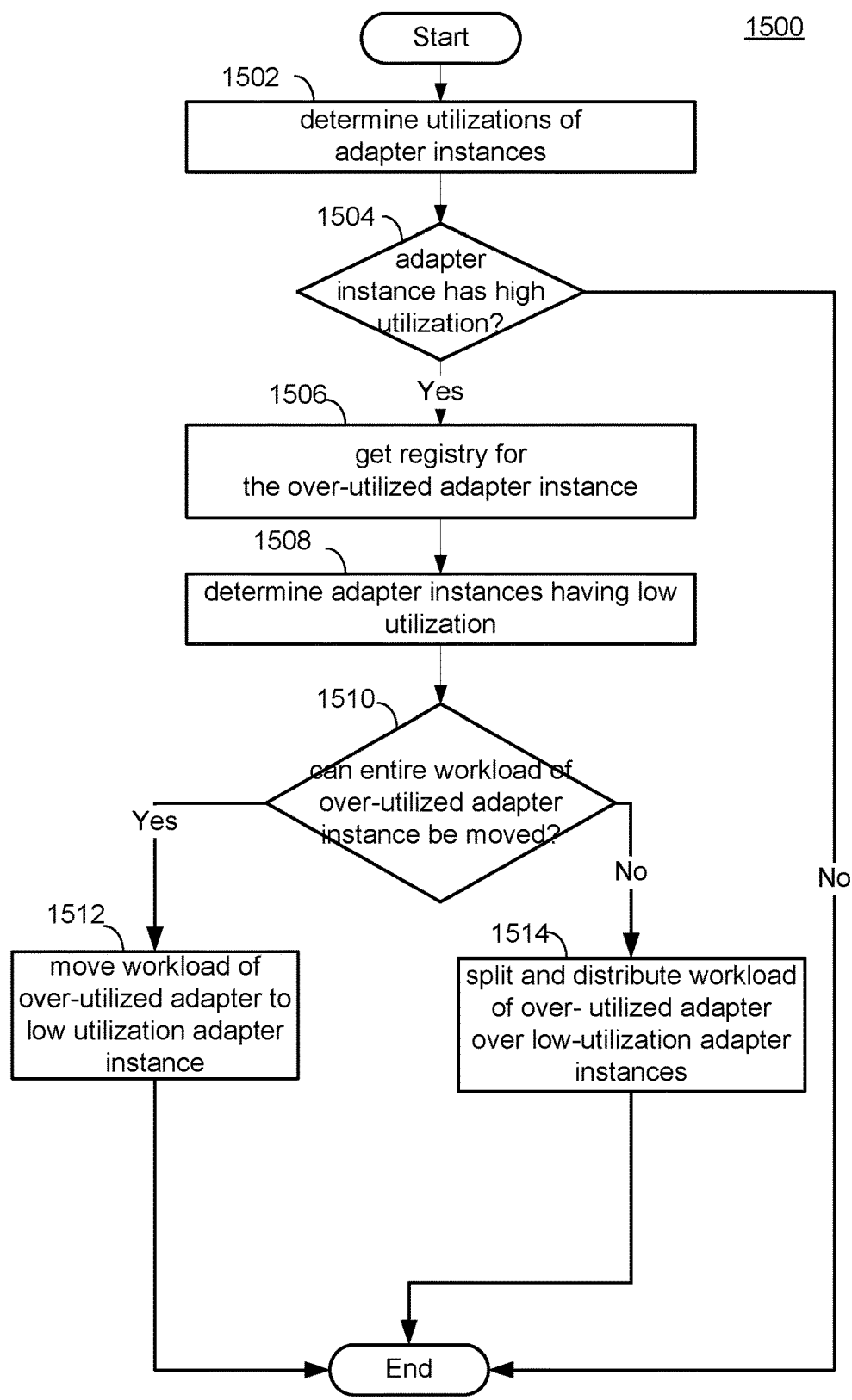
FIG. 15 is an overall flow diagram depicting operations for distributing a workload among multiple adapter instances in FIG. 14.

FIG. 14 is a block diagram of a distributed system having multiple adapter instances in which embodiments may be practiced and FIG. 15 depicts an overall flow diagram for distributing a workload among multiple adapter instances.

In FIG. 14, each adapter instance 1458, 1460, 1462 is configured to function as a broker in the Kafka system. Each adapter instance 1458, 1460, 1462 has a Kafka API 1464, a registry or registry copy 1468, local cache 1470, and Corfu API 1466. The adapter layer 140 also includes a ZooKeeper service 1474.

Each registry 1468 contains a list of <topic, partition> sets that are to be serviced by each adapter instance 1458, 1460, 1462. In one embodiment, the registries 1468 are identical to each other. In another embodiment, the registries 1468 of some adapter instances are different from other adapter instances.

Each local cache 1470 stores data retrieved from the Corfu system 846 and each registry 1468 stores the <topic, profile> sets that the adapter instances have been assigned to service. Thus, each adapter instance acts essentially as a virtual broker with the cache being the broker's local storage (instead of a local disk, as depicted in FIG. 4) and the Corfu system 846 being the persistent or backing storage for the cache. Additionally, the Corfu system 846 guarantees that reads from persistent storage always return the latest written data, as the tail of the append-only log 110 in FIG. 1 is always pushed to the adapter instances 1458, 1460, 1462.

In FIG. 15, a coordinator node in the Corfu system, such as that depicted in FIG. 12, first determines, in step 1502, the utilizations of the several adapter instances caused by Kafka fetches such as those depicted in FIG. 11. If the coordinator discovers that one of the adapter instances has a fetch utilization that is above a predetermined threshold, as determined in step 1504, then the coordinator obtains in step 1506 the registry for the over-utilized adapter so that it can analyze the <topic, partition> sets which the adapter is servicing. In addition, the coordinator determines, in step 1508, adapter instances that have low utilization, i.e., utilization significantly below the predetermined threshold, as these are candidates for taking on some or all of the workload of the over-utilized adapter instance. Detection of adapter instance utilization can rely on heuristics that look at the CPU utilization, memory space utilization, network and paging activity of the adapter instances.

At step 1510, the coordinator selects one of two strategies, depending on the workload of the over-utilized adapter instance and the utilizations of the other adapter instances. If the entire workload of the over-utilized adapter instance can be moved to a different adapter instance, as determined in step 1510, then that workload is moved in step 1512 to a different adapter instance. Alternatively, if the entire workload cannot be moved as determined in step 1510, then the workload of the adapter instance is divided and distributed over the available lower-utilization adapter instances in step 1514. In one embodiment, a rule such as the following can be used to determine whether to move and/or divide an adapter instance load. If the adapter instance load is greater than 90%, the select 25% of the load to move. If the load is greater than 75%, then select 5% of the load to move; if the load is less than 75%, the do not move any of the load.

Figure 16:
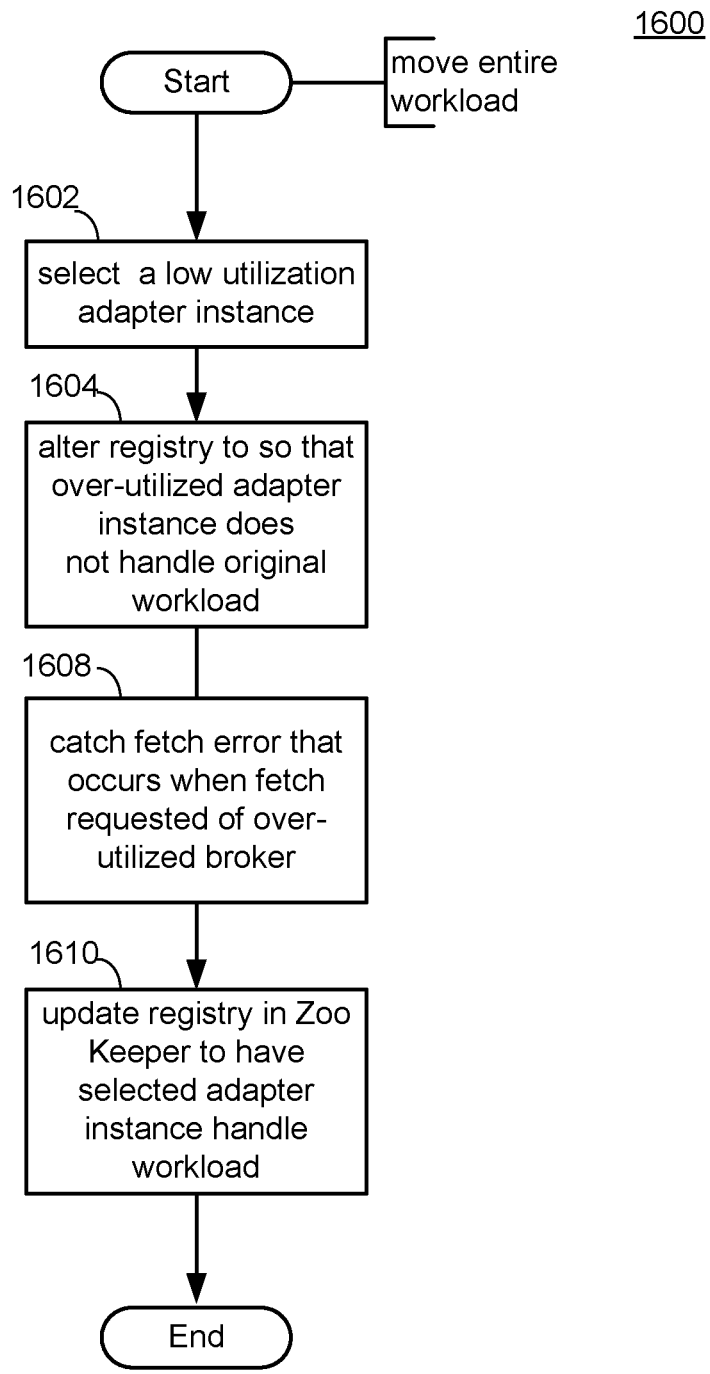
FIG. 16 is a flow diagram for moving a workload from one adapter instance to another adapter instance.

FIG. 16 depicts a flow diagram for moving a workload from one adapter instance to another adapter instance and FIG. 18 depicts the original registry 1802 in FIG. 18 for an adapter instance, say adapter instance 1, which has entries <topic1, partition1> 1804, <topic2, partition2> 1806 and <topic2 partition2> 1808 and is deemed over-utilized. In step 1602, a low utilization adapter instance is selected, say, for example, adapter instance 2. In step 1604, the registry for the over-utilized adapter instance, adapter instance 1, is altered so that it does not handle its assigned workload. In step 1606, a standard fetch error is caught, which arises from a fetch request for the <topic, partition> in the previously assigned workload is requested of adapter instance 1. In response to the error, the register in the ZooKeeper 1474 of FIG. 14 is updated in step 1610, to have the selected adapter instance, adapter instance 2, handle the workload and this information is distributed to all adapter instances and clients. Moving the workload to a different adapter instance is possible because each adapter instance has access to and can read from anywhere in the entire shared append-only log 110 in FIG. 1.

FIG. 19 depicts an altered registry when moving a workload from one adapter instance to another adapter instance as illustrated in FIG. 16. As shown in FIG. 19, entries <topic 1, partition1> 1904, <topic2, partition1> 1906 and <topic2, partition2> 1908 are moved to adapter instance 2 by changing altering entries 1804, 1806, 1808 in the original registry 1802 depicted in FIG. 18 so that registry 1902 results. This triggers a standard 'broker not owner' error to occur in response to a Fetch request for <topic 1, partition1>, <topic2, partition1> and <topic2, partition2> from broker 1 by a client. In response, the ZooKeeper and all clients are updated with the changed registry 1902. The cache in adapter instance 2, i.e., the adapter instance to which the workload is moved, is ineffective for a short time until enough fetches to adapter instance 2 occur to fill the cache with data relating to the moved workload.

Figure 17:
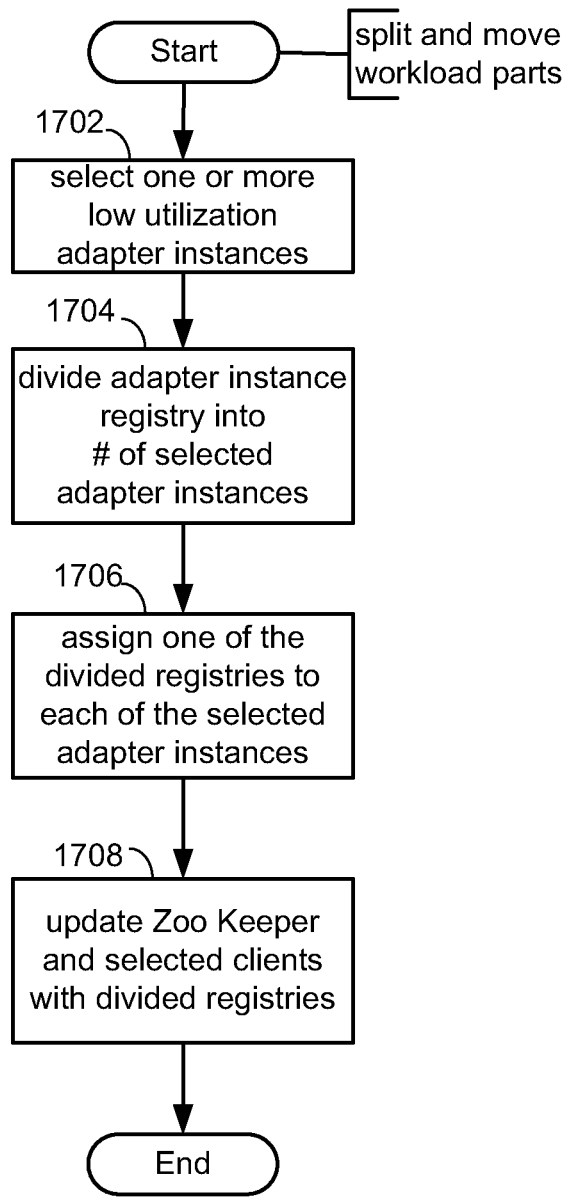
FIG. 17 is a flow diagram for moving a workload from one adapter instance to multiple other adapter instances.

FIG. 17 depicts a flow diagram for moving a workload from one adapter instance to multiple other adapter instances. In step 1702, one or more low utilization adapter instances are selected for receiving portions of the workload to be moved. In step 1704, registry entries for the overutilized broker are divided up and distributed over the number of selected adapter instances. In step 1706, each of the divided registries is assigned to a selected adapter instance. In step 1708, the Zoo Keeper is updated with the divided registries as well as certain selected clients.

FIG. 20 depicts a divided registry when moving a workload from one adapter instance to multiple other adapter instances. As shown, <topic1, partition1> 2004 is kept on adapter instance 1, but <topic2, partition1> 2006 is moved to adapter instance 2 and <topic2, partition2> 2012 is moved to adapter instance 3. As depicted, the registry 1802 in FIG. 18 is thus divided and the resulting registries 2002, 2008 are provided to the Zoo Keeper. Some of the plurality of Kafka clients 852, 854, 856 receive registry 1 2002 and other of the plurality of Kafka clients 852, 854, 856 receive registry 2 2008. Thus, different Kafka clients now have different registries, thereby distributing portions of the load of adapter instance 1 over two additional adapter instances. The maximum number of different client registries is equal to the number of adapter instances.

Thus, by instantiating multiple adapters, each having access to the entire shared append-only log and providing each with a cache, workloads of each adapter instance can be moved very quickly among the multiple adapters. Servicing the workload is efficient due to the multiple caches of the multiple workload-optimized adapter instances.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for distributing a workload over a plurality of adapter instances, the method comprising:
    determining a utilization for each of the plurality of adapter instances due to servicing read requests of an application, wherein each of the plurality of adapter instances includes a registry and wherein each registry includes entries that describe the workload of the respective adapter instance;
    determining that the utilization of one of the plurality of adapter instances exceeds a threshold and designating the one adapter instance as an over-utilized adapter instance;
    obtaining the registry entries of the over-utilized adapter instance;
    identifying, among the plurality of adapter instances, one or more adapter instances that have a utilization significantly below the threshold;
    if one of the identified adapter instances can service the entire workload of the over-utilized adapter instance without exceeding the threshold, moving the workload of the over-utilized adapter instance to the identified one adapter instance by altering the registry entries of the over-utilized adapter instance; and
    otherwise, splitting the workload into first and second partitions and moving the first partition to a first one of the identified adapter instances that includes a first registry and the second partition to a second one of the identified adapter instances that includes a second registry by splitting the registry entries of the over-utilized adapter instance into the first and the second registries such that registry entries corresponding the first partition reside in the first registry and entries corresponding to the second partition reside in the second registry.

2. The method of claim 1,
    wherein the read requests are sent to each of the adapter instances by a plurality of clients; and
    wherein when the workload is moved to one of the identified adapter instances,
    each of the plurality of clients of the application uses the same registry included in the identified adapter instance.

3. The method of claim 1,
    wherein the read requests are sent to each of the adapter instances by a plurality of clients; and
    wherein a first portion of the plurality of clients uses the first registry and a second portion of the plurality of clients uses the second registry.

4. The method of claim 1, wherein each of the adapter instances has a cache for caching read requests of the application.

5. The method of claim 4, wherein each cache obtains read request data from a persistent, append-only log accessible to the plurality of adapter instances.

6. The method of claim 1, wherein determining utilizations of the plurality of adapter instances includes determining one or more of CPU utilization, memory utilization, network activity, and paging activity of the adapter instances.

7. The method of claim 1, wherein the application is Kafka.

8. A non-transitory computer-readable medium containing instructions, which when executed by one or more processors, perform a method for distributing a workload over a plurality of adapter instances, the method comprising:
    determining a utilization for each of the plurality of adapter instances due to servicing read requests of an application, wherein each of the plurality of adapter instances includes a registry and wherein each registry includes entries that describe the workload of the respective adapter instance;
    determining that the utilization of one of the plurality of adapter instances exceeds a threshold and designating the one adapter instance as an over-utilized adapter instance;
    obtaining the registry entries of the over-utilized adapter instance;
    identifying, among the plurality of adapter instances, one or more adapter instances that have a utilization significantly below the threshold;
    if one of the identified adapter instances can service the entire workload of the over-utilized adapter instance without exceeding the threshold, moving the workload of the over-utilized adapter instance to the identified one adapter instance by altering the registry entries of the over-utilized adapter instance; and
    otherwise, splitting the workload into first and second partitions and moving the first partition to a first one of the identified adapter instances that includes a first registry and the second partition to a second one of the identified adapter instances that includes a second registry by splitting the registry entries of the over-utilized adapter instance into the first and the second registries such that registry entries corresponding the first partition reside in the first registry and entries corresponding to the second partition reside in the second registry.

9. The non-transitory computer-readable medium of claim 8,
    wherein the read requests are sent to each of the adapter instances by a plurality of clients; and
    wherein when the workload is moved to one of the identified adapter instances
    each of the plurality of clients of the application uses the same registry included in the identified adapter instance.

10. The non-transitory computer-readable medium of claim 8,
    wherein the read requests are sent to each of the adapter instance by a plurality of clients; and
    wherein a first portion of the plurality of clients uses the first registry and a second portion of the plurality of clients uses the second registry.

11. The non-transitory computer-readable medium of claim 8, wherein each of the adapter instances has a cache for caching read requests of the application.

12. The non-transitory computer-readable medium of claim 11, wherein each cache obtains read request data from a persistent, append-only log accessible to the plurality of adapter instances.

13. The non-transitory computer-readable medium of claim 8, wherein determining utilizations of the plurality of adapter instances includes determining one or more of CPU utilization, memory utilization, network activity, and paging activity of the adapter instances.

14. The non-transitory computer-readable medium of claim 8, wherein the application is Kafka.

15. A computer system comprising:
a persistent, append-only log; and
a plurality of servers, wherein the plurality of servers support the execution of a plurality of adapter instances, each adapter instance containing an application interface, a registry, and an interface to the persistent, append-only log; and
wherein the servers are configured to:
determine determining a utilization for each of the plurality of adapter instances due to servicing read requests of an application, wherein each of the plurality of adapter instances includes a registry and wherein each registry includes entries that describe the workload of the respective adapter instance;
determine that the utilization of one of the plurality of adapter instances exceeds a threshold and designating the one adapter instance as an over-utilized adapter instance;
obtain the registry entries of the over-utilized adapter instance;
identify, among the plurality of adapter instances, one or more adapter instances that have a utilization significantly below the threshold;
move the workload of the over-utilized adapter instance to the identified one adapter instance by altering the registry entries of the over-utilized adapter instance if one of the identified adapter instances can service the entire workload of the over-utilized adapter instance without exceeding the threshold; and
otherwise, split the workload into first and second partitions and moving the first partition to a first one of the identified adapter instances that includes a first registry and the second partition to a second one of the identified adapter instances that includes a second registry by splitting the registry entries of the over-utilized adapter instance into the first and the second registries such that registry entries corresponding the first partition reside in the first registry and entries corresponding to the second partition reside in the second registry.

16. The method of claim 15,
wherein the read requests are sent to each of the adapter instances by a plurality of clients; and
wherein when the workload is moved to one of the identified adapter instances
each of the plurality of clients of the application uses the same registry included in the identified adapter instance.

17. The method of claim 15,
wherein the read requests are sent to each of the adapter instance by a plurality of clients accessing the application interface; and
wherein a first portion of the plurality of clients uses the first registry and a second portion of the plurality of clients uses the second registry.

18. The method of claim 15, wherein each of the adapter instances has a cache for caching read requests of the application.

19. The method of claim 18, wherein each cache obtains read request data through the interface to the persistent, append-only log.

20. The method of claim 15, wherein determining utilizations of the plurality of adapter instances includes determining one or more of CPU utilization, memory utilization, network activity, and paging activity corresponding to the adapter instances.

* * * * *